United States Patent [19]
Belart et al.

[11] 4,384,745
[45] May 24, 1983

[54] PRESSURE REDUCER FOR HYDRAULIC BRAKE SYSTEMS

[75] Inventors: Juan Belart, Walldorf; Reinhard Rauschenbach, Langen-Oberlinden, both of Fed. Rep. of Germany

[73] Assignee: ITT Industries, Inc., New York, N.Y.

[21] Appl. No.: 231,837

[22] Filed: Feb. 5, 1981

[30] Foreign Application Priority Data
Mar. 26, 1980 [DE] Fed. Rep. of Germany ....... 3011633

[51] Int. Cl.³ .............................................. B60T 8/26
[52] U.S. Cl. ................... 303/6 C; 137/493.9; 303/69
[58] Field of Search ................. 303/6 C, 6 R, 84 A, 303/84 R, 68–69; 188/349; 137/493.9, 505.18; 60/591

[56] References Cited

U.S. PATENT DOCUMENTS

| 3,088,285 | 5/1963 | Giacosa et al. | 303/6 C |
| 3,258,924 | 7/1966 | Stelzer | 303/6 C X |
| 3,394,546 | 7/1968 | Stelzer | 303/6 C X |
| 3,597,009 | 8/1971 | Baldwin | 303/6 C |
| 3,814,121 | 6/1974 | Lawson | 137/505.18 X |

FOREIGN PATENT DOCUMENTS

| 1555387 | 10/1970 | Fed. Rep. of Germany | |
| 2335564 | 1/1974 | Fed. Rep. of Germany | 188/349 |
| 2320216 | 7/1976 | France | 303/6 C |

Primary Examiner—Douglas C. Butler
Attorney, Agent, or Firm—John T. O'Halloran; Alfred C. Hill

[57] ABSTRACT

A pressure reducer for hydraulic brake systems comprising a valve formed by the head of a spring-loaded piston and by a sealing ring which is urged by a spring against a step of the housing. Arranged between the spring and the sealing ring is an engaging plate which is carried along by the piston after the piston has travelled an amount smaller than the valve stroke. This results in an exactly defined valve stroke and at the same time results in a quick opening of the valve upon decrease of the inlet pressure.

11 Claims, 2 Drawing Figures

PRESSURE REDUCER FOR HYDRAULIC BRAKE SYSTEMS

BACKGROUND OF THE INVENTION

The present invention relates to a pressure reducer for hydraulic brake systems comprising a piston penetrating a sealing ring with play, a piston head of enlarged diameter forming a valve together with the sealing ring, which valve is able to separate an inlet chamber and an outlet chamber in the housing, and, in the rest position, a first spring presses the piston against a stop in the outlet chamber and a second spring presses the sealing ring in the same direction against a step of the housing to thereby define the valve stroke.

In a known pressure reducer of this type, such as disclosed in FIG. 4 of German Patent DE-AS No. 1,555,387, the piston may be loaded by a spring whose initial tension determines the change-over pressure of the pressure reducer. With a sealing ring inserted, a second spring concentrically enclosing the piston exerts pressure on the sealing ring, thus reliably pressing it against the step. The valve stroke so established will bring about an exactly defined change-over point as the inlet pressure increases. However, the second spring will have a retarding effect on the quick opening of the valve upon a drop in the inlet pressure, since the axial displacement of the sealing ring required to this end will be possible only if the inlet port side pressure has decreased to the point that the initial tension of the second spring has been overcome. By means of a sealing washer, the other end of this second spring presses a second annular seal against the front surface of the inlet chamber, the second annular seal serving as a piston seal. The thus produced deformation of the sealing ring material will lead to a wear which cannot be neglected.

It is also known from FIGS. 1 and 3 of German Patent DE-AS 1,555,387 to dispense with such a second spring for the loading of the valve sealing ring to ensure a quick opening of the valve upon a drop in the inlet pressure. Then, however, the sealing ring will not reliably abut against the housing step in the rest position. Because of the thus undefined valve stroke the change-over pressure is not exactly determined.

SUMMARY OF THE INVENTION

An object of the present invention is to provide a pressure reducer of the type described above, having an exactly defined valve stroke and safeguarding a quick opening of the valve upon a drop in the inlet pressure.

A feature of the present invention is the provision of a pressure reducer for hydraulic brake systems comprising a housing having a longitudinal axis; a piston disposed in the housing coaxial of the axis penetrating a sealing ring with play disposed in the housing coaxial of the axis, the piston having a head of enlarged diameter forming a valve in cooperation with the sealing ring, the valve controlling a connection between an inlet chamber and an outlet chamber disposed in the housing; a first spring disposed in the housing coaxial of the axis to press the head against a stop in the outlet chamber in a rest position of the reducer; a second spring disposed in the housing coaxial of the axis to press the sealing ring toward the stop against a step in the housing, the first and second springs, the stop and the step defining a stroke of the valve; and an engaging plate disposed in the housing coaxial of the axis between the sealing ring and the second spring, the engaging plate being capable of being carried axially along by the piston in a direction away from the stop after the piston has travelled a predetermined distance less than the stroke of the valve.

In this construction the second spring will be fully effective in the rest position of the valve. The sealing ring will be pressed against the step and there will be an exact definition of the valve stroke. In the working position, on the other hand, the second spring will be lifted off of the sealing ring by means of the engaging plate carried along by the sealing ring. Thus, upon a drop in the inlet pressure there will be an immediate axial displacement of the sealing ring without having to overcome the force of a spring. Thus, the desired quick opening of the valve is brought about.

A further advantage lies in the fact that the second spring is working in parallel with the first spring at the time of the valve's closure. Thus, it is possible to use a weaker spring as a first spring for a given change-over point. In doing so, the ratio of the forces of the springs may be selected freely within a large range. In particular, it is also possible to choose a relatively strong spring as the second spring. This will enable a considerable reduction of the size of the springs and permit the structural size of the pressure reducer to be kept very small, in particular in the case of a fixed change-over value.

It will be an advantage for the engaging plate to have engaging means pointing inwards and projecting up into the path of motion of a piston shoulder. Such an engaging plate can easily be formed out of sheet metal and easily mounted by being slipped over the piston.

It is possible to rate the first spring small enough so that it will engage an axial bore of the piston which will lead to a considerable reduction of the structural size.

Further, the two springs may axially overlap. Thereby it will be possible to achieve an axial shortening of the pressure reducer.

The same purpose will be served if the second spring axially overlaps the usual piston seal.

It will further be advantageous if, on the outside the piston seal is surrounded by a support of the housing and if the other end of the second spring is supported on a ring washer resting at the front face of this support of the housing. In this way, the piston seal will be secured reliably. Yet, it will not be loaded by any force of a spring, the wear being correspondingly small.

In a preferred embodiment, the piston is disposed completely in a chamber of the housing which exceeds the piston length by an amount only slightly more than the valve stroke; a coaxial connecting bore branches off of this chamber of the housing on the outlet port side; and a coaxial connecting branch begins a small distance from the other end of the chamber of the housing. Thus, a pressure reducer will result, which will be easy to fit into the normal connection bore of a pressure generator, e.g. of a master cylinder, at whose other end a pressure line's connecting branch normally directly connected with the pressure generator may be connected, and whose space requirements will be very small, e.g. less than 40 mm in the axial direction and less than 30 mm in the diametric direction.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENTS

Figure 1:
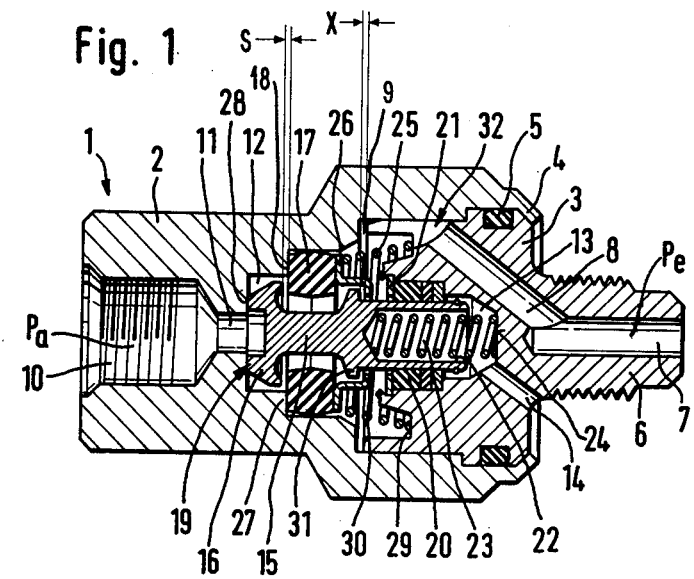
FIG. 1 is a longitudinal cross sectional view of a first embodiment of a pressure reducer in accordance with the principles of the present invention.

Referring to FIG. 1, the housing 1 comprises a main part 2 and an insert 3 inserted therein and additionally secured by means of a flanged rim 4. A seal 5 seals the two with respect of each other. At insert 3 there is a coaxial connecting branch 6 with a bore 7 which leads into an inlet chamber 9 via a diagonal bore 8. Main part 2 has a coaxial connecting bore 10 communicating with an outlet chamber 12 via a bore 11. Further, insert 3 accommodates a piston chamber 13 communicating with the atmosphere via a diagonal bore 14.

A piston 15 penetrates a sealing ring 17 with play. Piston 15 has an enlarged piston head 16. By means of a sealing edge, piston head 16 forms a valve 19 by abutting the front face 18 of sealing ring 17. Valve 19 separates inlet chamber 9 from outlet chamber 12. Piston 15 is passed through a piston seal 20 outwards into piston chamber 13. Piston seal 20 is kept in insert 3 by a plate 21 firmly fastened thereto. Further, piston 15 has an axial bore 22 containing a first spring 23. Spring 23 has one end abutting the bottom of axial bore 22 and the other end abutting a front face 24 of insert 3. A conically shaped second spring 25 acts on sealing ring 17 by means of an engaging plate 26, pressing sealing ring 17 against a step 27 of housing 1 in the rest position. Since spring 23 presses an end of piston 15 against a stop 28 at the bottom of outlet chamber 12 there will be an exact definition of the valve stroke s. The other end of second spring 25 supports itself at a surface 29 of insert 3, thus, overlapping both first spring 23 and piston seal 20 in the axial direction. Engaging plate 26 has engaging means 30 pointing inwardly and lying in the path of motion of a shoulder 31 of the piston 15. In the represented rest position, engaging means 30 is spaced a distance x from shoulder 31. Distance x is smaller than the valve stroke s.

Inlet chamber 9, outlet chamber 12 and piston chamber 13 together form a chamber 32 of housing 1 whose axial length slightly exceeds the length of piston 15 plus the valve stroke s. Due to the axial overlapping of springs 23 and 25 as well as the fitting of spring 23 in axial bore 22 this small length will be sufficient which in a practical embodiment will only need to amount to slightly more than 20 mm (millimeters).

Inlet chamber 9 is connected with a pressure generator, e.g. with a brake-pedal-operated master cylinder. It may be screwed directly into a connecting bore of this pressure generator. Outlet chamber 12 is connected with a brake cylinder, e.g. with a rear wheel cylinder. In doing so, a usual connecting line, as normally introduced into the master cylinder, may be screwed directly into connecting bore 10. After inserting connecting branch 6 into a corresponding connecting bore the length of the pressure reducer will protrude very small. In a practical embodiment it was less than 40 mm.

Upon an increase of the inlet pressure $P_e$ during operation, this pressure will be transmitted directly into outlet chamber 12 by way of open valve 19. Thus, the outlet pressure $P_a$ will equal the inlet pressure. With the inlet pressure increasing, piston 15 will be displaced to the right in the drawing, since its surface facing inlet chamber 9 is smaller than the surface facing outlet chamber 12. After a distance x, piston 15 will carry along second spring 25 by means of engaging plate 26. Thus, there will be an increase in the prestressing force against which piston 15 is closing. The entire valve stroke s will therefore be achieved at a defined inlet pressure. Upon a further increase in the inlet pressure there will result a slower increase in the outlet pressure $P_a$ in a known manner, since the pressures will change dependent upon the ratio of the inlet port side and outlet port side surfaces of piston 15. If now again there is a drop in the inlet pressure $P_e$ the then prevailing outlet pressure $P_a$ will immediately displace sealing ring 17 to the right in the drawing, since it will not be loaded by spring 25. This displacement will lead to an immediate opening of valve 19 and, hence, to a pressure compensation which will release the brakes.

Figure 2:
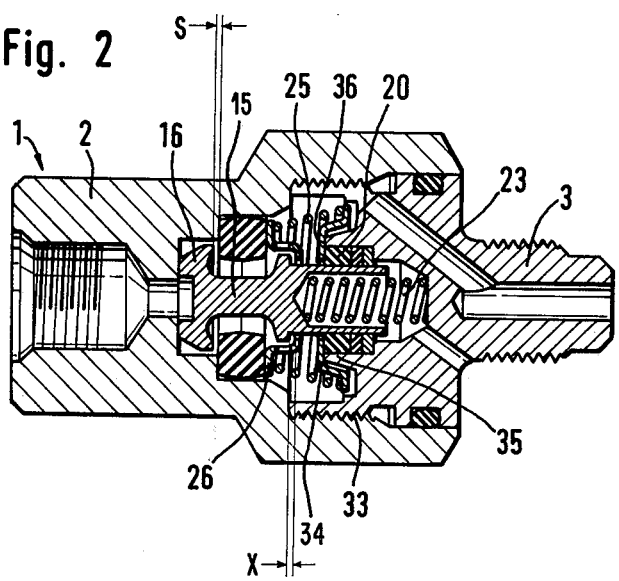
FIG. 2 is a longitudinal cross sectional view of a second embodiment of a pressure reducer in accordance with the principles of the present invention.

In the embodiment according to FIG. 2, the same mode of operation will result. Therefore the same reference numerals will be used for like parts. Insert 3, however, is not flanged to main part 2 of housing 1, but is rather fastened by means of a thread 33. On the side spaced from engaging plate 26, spring 25 supports itself on a ring washer 34 which keeps annular seal 20 in its support 35 of housing 1, thus taking over the function of plate 21. In doing so, ring washer 34 will rest on the front face 36 of support 35 of housing 1. Consequently, piston seal 20 will not be loaded by the force of spring 25, yet may easily be replaced if insert 3 is screwed out of main part 2.

This principle is also applicable in pressure reducers having no fixed change-over points. In this case, first spring 23 is given a different and/or variable prestress by an outside control element.

While we have described above the principles of our invention in connection with specific apparatus, it is to be clearly understood that this description is made only by way of example and not as a limitation to the scope of our invention as set forth in the objects thereof and in the accompanying claims.

We claim:

1. A pressure reducer for hydraulic brake systems comprising:
   a housing having a longitudinal axis;
   a piston disposed in said housing coaxial of said axis penetrating a sealing ring with play disposed in said housing coaxial of said axis, said piston having a head of enlarged diameter forming a valve in cooperation with said sealing ring, said valve controlling a connection between an inlet chamber and an outlet chamber disposed in said housing;
   a first spring disposed in said housing coaxial of said axis to press said head against a stop in said outlet chamber in a rest position of said reducer;
   a second spring disposed in said housing coaxial of said axis to press said sealing ring toward said stop against a step in said housing, said first and second springs, said stop and said step defining a stroke of said valve; and
   an engaging plate disposed in said housing coaxial of said axis between said sealing ring and said second spring, said engaging plate being spaced from a projection on said piston a predetermined distance less than said stroke of said valve, said projection carrying said engaging plate axially in a direction away from said stop after said piston has travelled said predetermined distance.

2. A pressure reducer according to claim 1, wherein said engaging plate includes an engaging means extending inwardly adjacent and spaced said predetermined distance from a shoulder on said piston, said engaging means and said shoulder cooperating to cause said engaging plate to be carried along by said piston after said piston has travelled said predetermined distance.

3. A pressure reducer according to claim 2, wherein said first spring engages a bottom of an axial bore of said piston.

4. A pressure reducer according to claim 3, wherein said first and second springs are disposed in an axially overlapping relationship with respect to each other.

5. A pressure reducer according to claim 4, further including
a piston seal disposed in axially spaced relationship with said sealing ring to slidably seal said piston in said housing, said second spring and said piston seal being disposed in an axially overlapping relationship with respect to each other.

6. A pressure reducer according to claim 5, further including
a support disposed in said housing coaxial of said axis surrounding said piston seal, one end of said second spring being supported by a ring washer disposed to bear against an end surface of said support adjacent said sealing ring.

7. A pressure reducer according to claims 1, 2, 3, 4, 5 or 6 wherein
said piston is disposed in a chamber of said housing including said inlet chamber and said outlet chamber, said chamber having an axial length exceeding the axial length of said piston by an amount only slightly greater than said stroke of said valve, and further including
a first coaxial connecting bore disposed in said housing connected directly to said chamber adjacent said outlet chamber; and
a second coaxial connecting bore disposed in said housing in axially spaced relationship with said chamber, said second bore being indirectly connected to said chamber adjacent said inlet chamber.

8. A pressure reducer according to claims 1, 2, 3 or 4, further including
a support disposed in said housing coaxial of said axis surrounding said piston seal, one end of said second spring being supported by a ring washer disposed to bear against an end surface of said support adjacent said sealing ring.

9. A pressure reducer according to claims 1, 2 or 3, further including
a piston seal disposed in axially spaced relationship with said sealing ring to slidably seal said piston in said housing, said second spring and said piston seal being disposed in an axially overlapping relationship with respect to each other.

10. A pressure reducer according to claims 1 or 2, wherein
said first and second springs are disposed in an axially overlapping relationship with respect to each other.

11. A pressure reducer according to claim 1, wherein said first spring engages a bottom of an axial bore of said piston.

* * * * *